INVENTOR.
Norman R. Hagler
BY
D. D. McGraw
ATTORNEY

INVENTOR.
Norman R. Hagler
BY
D. D. McGraw
ATTORNEY

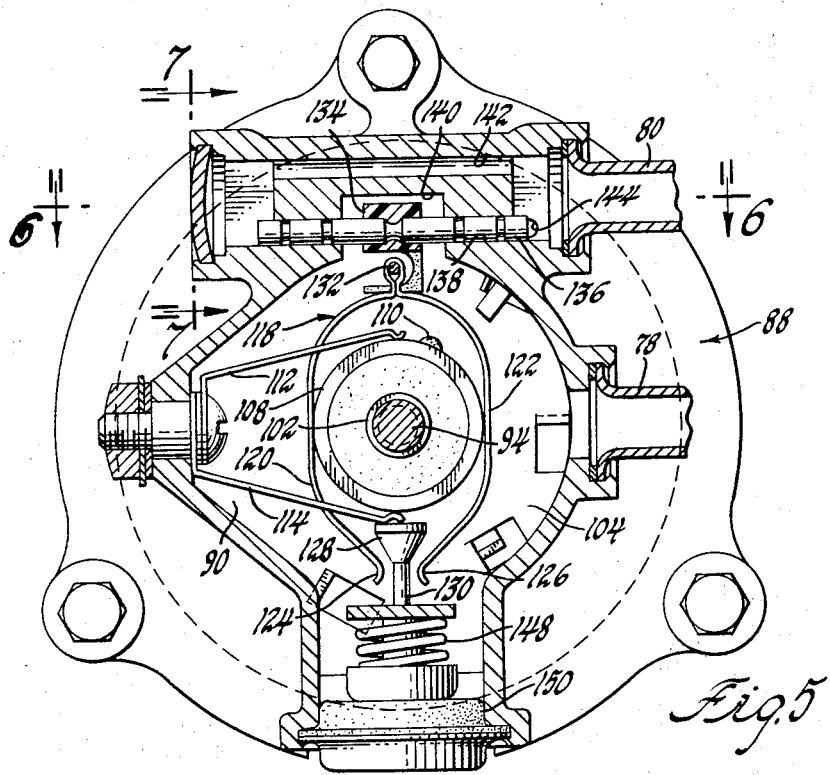
Fig. 5
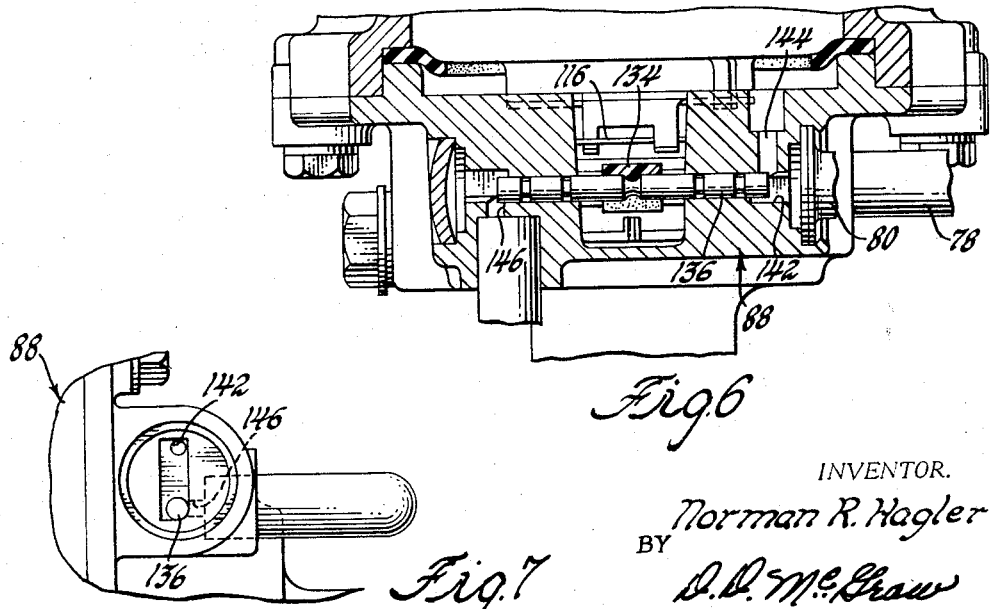
Fig. 6
Fig. 7
INVENTOR.
Norman R. Hagler
BY
D. D. McGraw
ATTORNEY

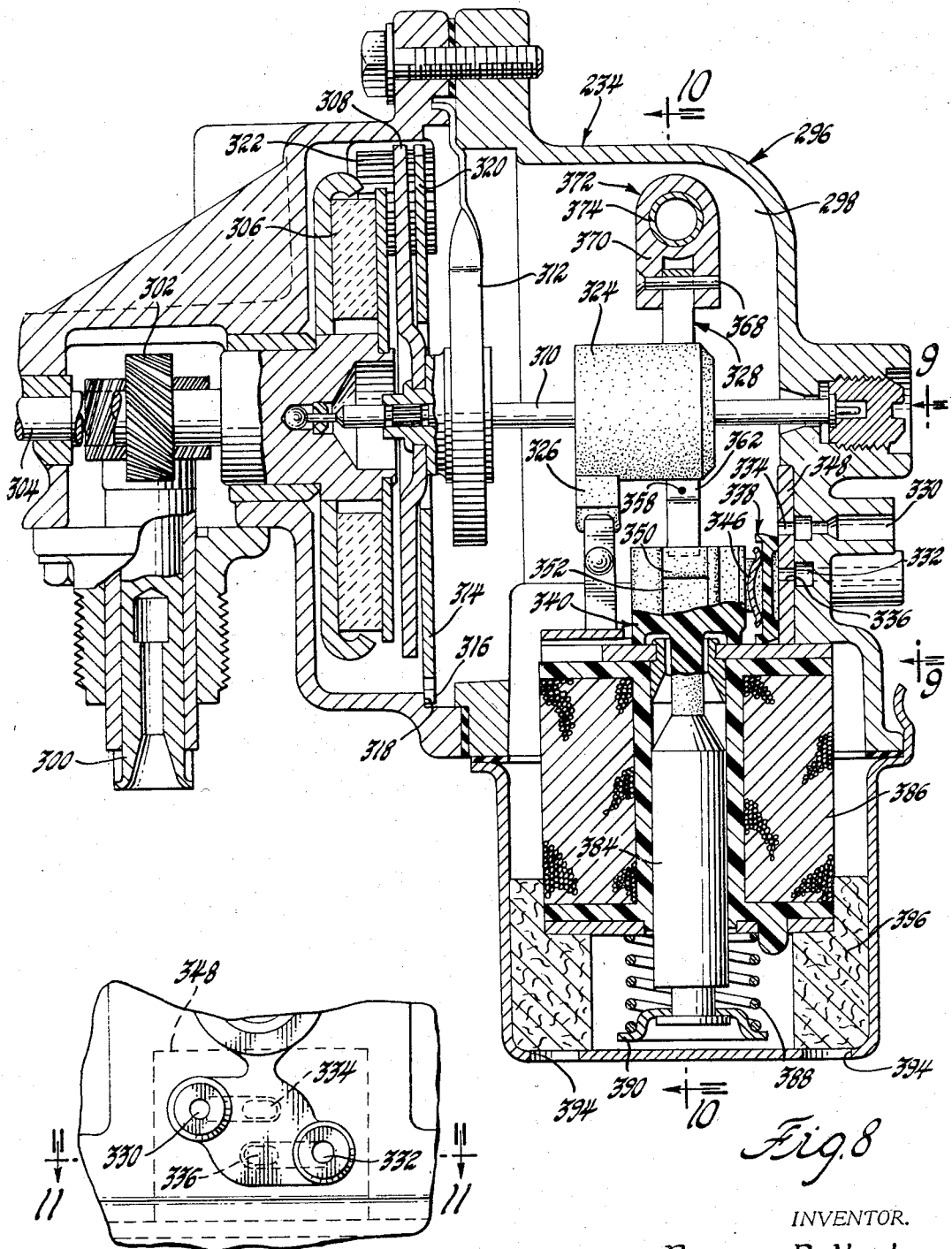

INVENTOR.
Norman R. Hagler
BY
D. D. McGraw
ATTORNEY

April 29, 1969 — N. R. HAGLER — 3,441,104

VEHICLE SPEED TRANSDUCER

Filed Aug. 29, 1967

INVENTOR.
Norman R. Hagler
BY
ATTORNEY

United States Patent Office 3,441,104
Patented Apr. 29, 1969

3,441,104
VEHICLE SPEED TRANSDUCER
Norman R. Hagler, Flint, Mich., assignor to General Motors Corporation, Detroit, Mich., a corporation of Delaware
Filed Aug. 29, 1967, Ser. No. 664,049
Int. Cl. B60k 31/00; F02d 11/08
U.S. Cl. 180—108
14 Claims

ABSTRACT OF THE DISCLOSURE

A speed transducer having a speed member rotating at various speeds within a speed range and causing a disc to move arcuately so that the arcuate disc position reflects the speed of the speed member, a clutch member substantially encircling the disc and being held in a spread position away from the disc and connected to an element of a control through a radial lost motion mechanism, and manually controlled means which releases the clutch member so that it grips the disc to establish a particular arcuate position relationship between the control element and the disc which reflects a desired speed. Arcuate movement of the disc causes linear movement of the control element through the radial lost motion mechanism to ultimately control the speed of the speed member so that the disc, clutch member and control member move in a sense to keep the speed member at the desired rotational speed, which was the speed existing when the clutch member was actuated and gripped the disc.

---

The invention relates to a speed transducer for a vehicle road speed control system and more particularly for such a system having a servomotor controlled by a speed error responsive valve, which in turn is controlled by actual vehicle speed and a desired vehicle speed setting. Controls are also provided as a part of the system which cause system inactivation upon the application of a vehicle control member such as a brake pedal, as well as direct manual inactivation, and desired vehicle speed resetting means. The system utilizes a source of fluid pressure different from atmospheric pressure as a power source. This pressure source is also the source from which a control signal is generated under influence of the speed error responsive valve in the transducer embodying the invention. The source of this fluid pressure may be engine intake manifold vacuum. The speed transducer is arranged to sense actual vehicle speed, to set a particular vehicle speed as the desired vehicle speed, and to deliver a speed error signal to a servomotor to power the engine throttle valve in such a manner as to control the vehicle engine speed and power to maintain a desired vehicle speed under variable road load conditions, and to be inactivated at will be the vehicle operator.

The transducer has a speed pickup arrangement driven through the speedometer cable so as to sense actual vehicle road speed. A rotary magnet is rotatably driven in accordance with vehicle speed and causes a disc, similar to the usual speedometer speed cup, to be displaced arcuately in accordance with the rotary speed of the magnet. Another disc, which also functions as a clutched member and is therefore a part of a clutch, is connected with the speed cup disc and is arcuately movable therewith. A clutching member, which is another part of the clutch, is provided which extends about the clutched member so that it can grip that member on opposite sides to establish a particular arcuate position relationship between the two members. The clutching member is a spring which has legs substantially encircling the clutched member for this purpose. The legs are internally spring biased toward each other so that the gripping action can occur if the legs are not being held apart. The free ends of the clutching member legs are so arranged in conjunction with a manually controlled cam that they may be spread apart to release the grip on the clutch member, or may be released so that the gripping action is re-established. The center portion of the spring forming the clutching member is constructed to provide a radial lost motion connection to an element of the control. The control element is mounted to move linearly as the clutching member moves arcuately. The control ultimately controls the speed of the vehicle and therefore the speed of the rotary magnet, so that arcuate movement of the clutching member as it grips the clutched member, caused by vehicle speed variations, causes the control element to move in a sense such that the control maintains vehicle speed substantially constant. This is accomplished through the medium of the control operatively urging the clutching element to a neutral, zero speed error, position.

IN THE DRAWINGS

FIGURE 5 is a cross section view of the speed transducer of FIGURE 3, with parts broken away, and taken in the direction of arrows 5—5 of that figure.

FIGURE 6 is a section view of a part of the speed transducer of FIGURE 3, as taken in the direction of arrows 6—6 of FIGURE 5.

FIGURE 7 is a fragmentary elevation view of a part of the speed transducer of FIGURE 3, as taken in the direction of arrows 7—7 of FIGURE 5.

FIGURE 8 is a cross section view, with parts broken away, of a modified speed transducer which may be utilized in the system of FIGURE 2.

FIGURE 9 is a fragmentary elevation view of a part of the speed transducer of FIGURE 8, taken in the direction of arrows 9—9 of that figure.

Figure 1:
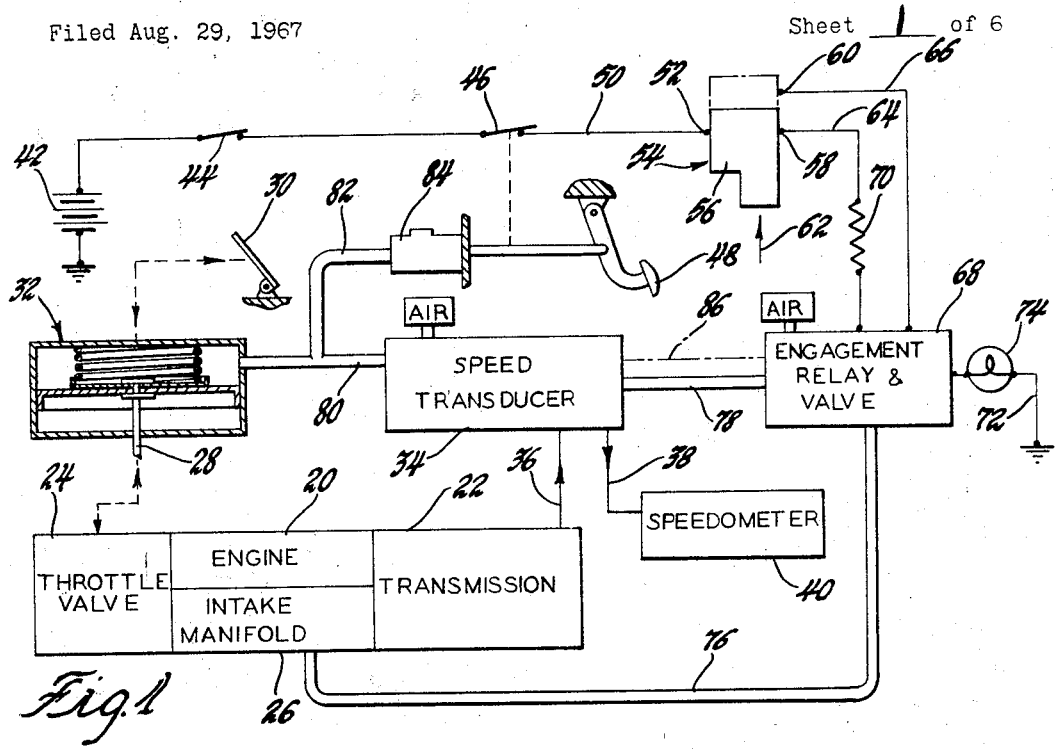
FIGURE 1 is a schematic representation of a system utilizing a speed transducer embodying the invention.

The speed control system schematically illustrated in FIGURE 1 is shown installed in a motor vehicle having an engine 20 driving a vehicle transmission 22 and having a throttle valve 24, an engine intake manifold 26, and throttle linkage 28 connected to the throttle valve and manually actuated by the accelerator pedal 30. The system includes a power servomotor 32 which is connected to the throttle linkage 28. As schematically illustrated, the power servomotor 32 is actually a part of the throttle linkage 28 interconnecting the accelerator pedal 30 with the throttle valve 24. A speed transducer assembly 34 receives an actual vehicle speed signal through the transmission output shaft driven flexible cable 36 and compares it to a desired vehicle speed to generate a speed error signal to control the servomotor 32. An extension 38 of the flexible cable 36 drives the usual vehicle speedometer 40.

Portions of the system are electrical and include the source of electrical energy schematically illustrated as the vehicle battery 42, the ignition switch 44 and a normally closed switch 46, which is opened when the vehicle brakes are applied by depression of the brake pedal 48. These electrical elements are in series in electrical lead 50, which connects the brake switch 46 to a contact 52 of a manually controlled switch 54. The slide bar 56 of switch 54 is biased so that it is normally in electrical contact with switch contact 52 and another switch contact 58. A third switch contact 60 is so positioned that movement of the slide bar 56 in the direction of the arrow 62 will cause all three contacts 52, 58 and 60 to be in electrical contact with the slide bar 56. This position of the slide bar is illustrated in dashed lines. Further movement of the slide bar 56 in the direction of arrow 62 will electrically disconnect contact 52 from the slide bar. Electrical leads 64 and 66 are respectively connected to contacts 58 and 60 and lead to the engagement relay and valve assembly 68. Lead 64 contains a suitable resistor 70. Lead 72 from the engagement relay 68 may be suitably connected to electrical ground through a signal lamp 74.

The fluid circuit includes a conduit 76 fluid connecting the engine intake manifold 26 to the engagement relay and valve assembly 68. A conduit 78 fluid connects the speed transducer assembly 34 and the assembly 68. The valve portion of assembly operates to close conduit 76 and open conduit 78 to atmospheric pressure when the engagement relay is deactivated, and to fluid connect conduits 76 and 78 when the engagement relay is activated. Thus engine intake manifold vacuum is provided to the speed transducer assembly 34 when the system is operative. The speed transducer assembly 34 generates a speed error signal by proportioning vacuum from conduit 78 and atmospheric air pressure in accordance with a desired vehicle speed and the actual vehicle speed signal received through cable 36. This signal is transmitted through conduit 80 to the power servomotor 32 and causes the servomotor to adjust the opening and closing of the throttle valve 24 in accordance with varying road load conditions. A conduit 82 is connected with conduit 80 and a valve 84. This valve is normally in the closed position when the brake pedal 48 is in the released position, so that the end of conduit 82 is closed. However, when the brake pedal is depressed, the valve 84 opens to atmospheric pressure, immediately allowing this pressure to enter the servomotor 32 and therefore deactivate the servomotor. Since the brake switch 46 is also opened by depression of the brake pedal, the engagement relay and valve assembly 68 will also be de-energized so that the valve portion of that assembly will close the end of conduit 76. The speed transducer 34 is schematically illustrated as having a mechanical connection 86 with the engagement relay and valve assembly 68. This connection is provided to drive a minimum speed switch electrically connected with electrical lead 66 and which is open until a certain minmium vehicle speed is attained. This speed may, for example, be set at 25 m.p.h. By employing this switch, the engagement relay may not be energized at lower speeds even though the switch 54 is operated in an attempt to activate the system.

The speed transducer illustrated in FIGURES 3 through 7 may be utilized in the system of FIGURE 1. The assembly includes a housing 88 having a chamber 90 formed therein which contains a vehicle actual speed signal generating mechanism and also contains a minimum speed engagement switch. The vehicle speed signal transmitted through cable 36 is received by the input shaft 92 which is rotatably received in housing 88. A through shaft 94 is also rotatably mounted in the housing and is connected to the input shaft 92. An output shaft 96 is connected to through shaft 94 and to the flexible cable 38 which drives the speedometer 40. A magnet 98 is connected to be rotatably driven by shaft 94 in accordance with vehicle speed. A speed cup 100 is mounted on a sleeve bearing 102 and is arcuately moved by the magnet 98 in accordance with actual vehicle speed, in a manner commonly accomplished in speedometer mechanisms. A field plate 104 is adjustably secured in housing 88 and positioned adjacent the speed cup 100 so that calibration adjustments may be made to the mechanism during manufacture, as may be necessary. A disc forming a cylindrical clutch member 106 is secured to sleeve bearing 102 and moves arcuately with the speed cup 100. An electrically conductive ring 108 is mounted on one end of the clutch member 106, and an electrically nonconductive cam 110 is positioned over an arcuate portion of ring 108. The minimum speed switch includes contact springs 112 and 114, which are aligned for electrical engagement with ring 108. However, cam 110 is so positioned that it engages contact spring 112 and holds that spring out of electrical contact with ring 108 until a predetermined desired minimum speed is attained and indicated by sufficient arcuate movement of speed cup 100 and clutch member 106 to remove the cam from engagement with the spring. The spring then moves into electrical engagement with ring 108 to close the minimum speed switch.

A torsion spring 116 is provided against which the speed cup 100 moves, and is so calibrated as to permit arcuate movement of the speed cup to accurately reflect vehicle speed. Therefore arcuate movement of the disc 106 also accurately reflects vehicle speed.

The other half of the clutch assembly which is utilized to set the desired speed is formed as a generally U-shaped spring 118 having arms 120 and 122 extending over the rubber-like clutch member 106. The arms are axially spaced from ring 108 and the contact springs 112 and 114 so that their sides are selectively engageable with the cylindrical outer surface of the clutch member 106. The clutch spring ends 124 and 126 are positioned more closely together than are the parts of the arms which engage the clutch member 106. A wedge or cam 128 mounted on a pin 130 extends between the spring ends and when in a lower position engages the ends so as to spread the arms 120 and 122 apart sufficiently to release the spring 118 from the clutch member 106. When the cam 128 is moved to the upper position shown in FIGURE 5, the arms 120 and 122 move inwardly, since they are spring biased in that direction, and grip clutch member 106 so that the spring will then move arcuately with the clutch member, as vehicle speed changes cause the clutch member 106 to move arcuately. The relationship of the clutch member and the spring at the time the clutch member was engaged by the spring arms establishes the desired vehicle speed as the actual speed at which the vehicle was traveling when the cam 128 was moved upwardly to release the spring ends.

The center portion of the spring 118 is located opposite the spring ends and has an elongated opening in which a pin 132 is received, thus providing a radial lost motion connection. This pin is attached to a valve clamp 134, which is secured to the center of the speed error valve 136. This valve is positioned in a bore 138 formed in the housing 88 and intersected by a recess 140 which receives the clamp 134 and allows sufficient axial movement of the valve in the bore in accordance with arcuate movement of the spring 118 to provide the necessary range for generation of a speed error signal. The housing 88 has a passage 142 formed therein and connecting with opposite ends of the valve 136 and with the modulated vacuum conduit 80. A vacuum orifice 144 connects passage 142 with the housing chamber 90, which is in turn connected to the engine intake manifold through conduit 78 when conduit 76 is connected with conduit 78 through the valve portion of assembly 68. This is the operative condition existing when the system is activated. When the system is inactive, chamber 90 is at atmospheric pressure through conduit 78 and the valve portion of assembly 68. Air at atmospheric pressure is also connected to passage 142 through air orifice 146. Orifices 144 and 146 are so positioned relative to the ends of valve 136 that their areas are modulated in a proportional relation during movement of the valve in one axial direction. The orifice positions and valve length are so established that when the valve is centered, as shown in FIGURES 5 and 6, the opposite ends thereof so control their respective orifices that each orifice is approximately half open. Therefore, when the system is inactive, the valve is nevertheless positioned in substantially that position which it will assume for a zero speed error, or neutral, position upon system activation.

The cam 128 and its pin 130 are urged downwardly by spring 148, which operates against a diaphragm 150. One side of diaphragm 150 is exposed to atmospheric pressure through aperture 152, and the other side is exposed to the pressure existing in housing chamber 90. When the housing chamber is at atmospheric pressure, the diaphragm 150 is positioned downwardly by spring 148 so that the cam 128 wedges spring ends 124 and 126 apart. When the engagement relay has been energized and the valve portion of assembly 68 establishes manifold vacuum in chamber 90 through conduit 78, the pressure differential acts on diaphragm 150 against the force of spring 148 to move cam 128 upwardly out of engagement with the spring ends 124 and 126. Thus the spring 118 clutches clutch member 106. Valve 136 will immediately become operative to control orifices 144 and 146 and to establish a pressure in the conduit 80 and servomotor 32. Any changes in vehicle speed will cause the valve 136 to modulate atmospheric pressure and manifold vacuum at orifices 144 and 146, resulting in a pressure change in the conduit 80 and the servomotor 32 which is a speed error signal and also a power signal which causes the servomotor to change the effective length of the throttle linkage 28 to apply a correction to the throttle according to the magnitude of the speed error.

Figure 2:
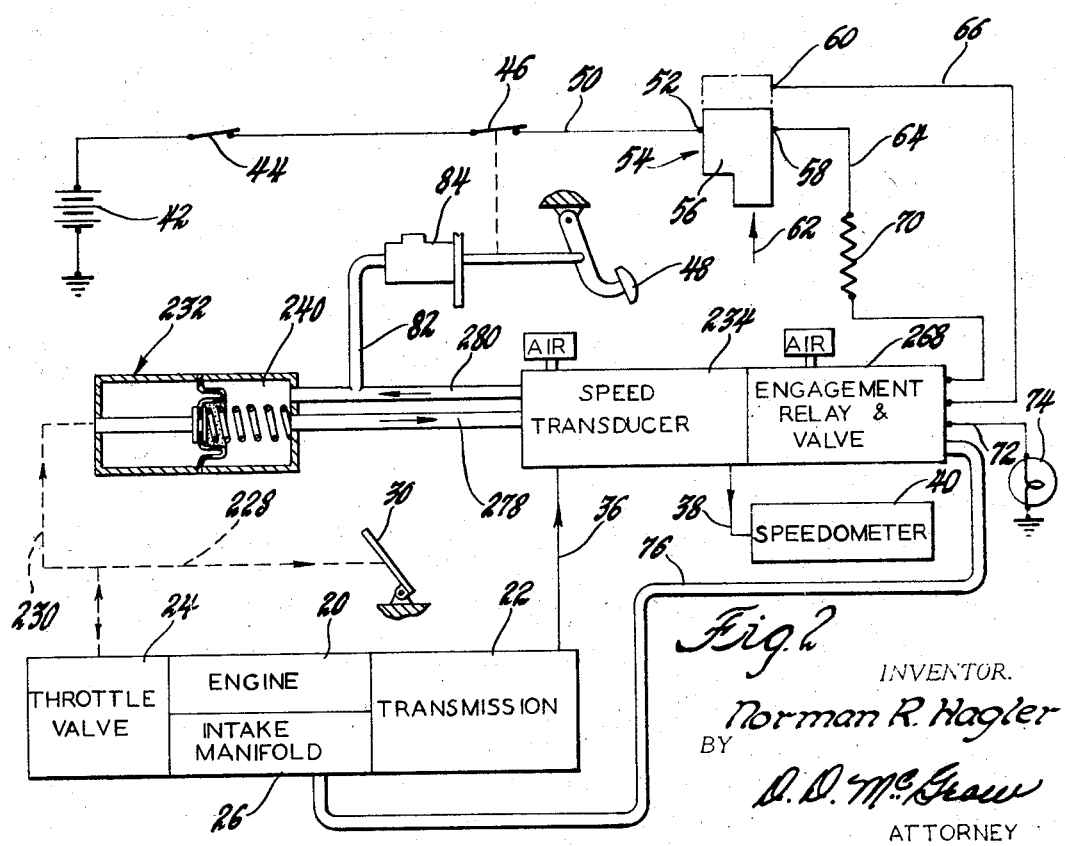
FIGURE 2 is a schematic representation of a modified system utilizing a speed transducer embodying the invention.
Figure 3:
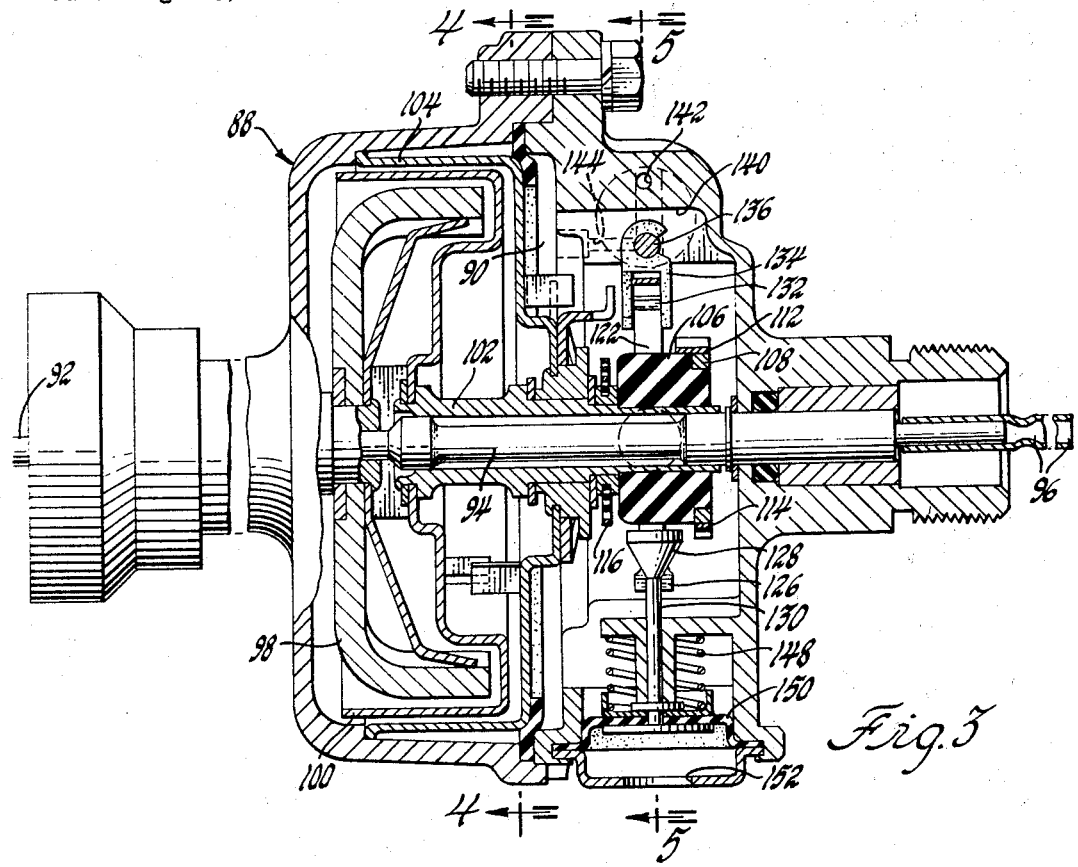
FIGURE 3 is a cross section view with parts broken away of a speed transducer embodying the invention and which may be utilized in the system shown in FIGURE 1.
Figure 4:
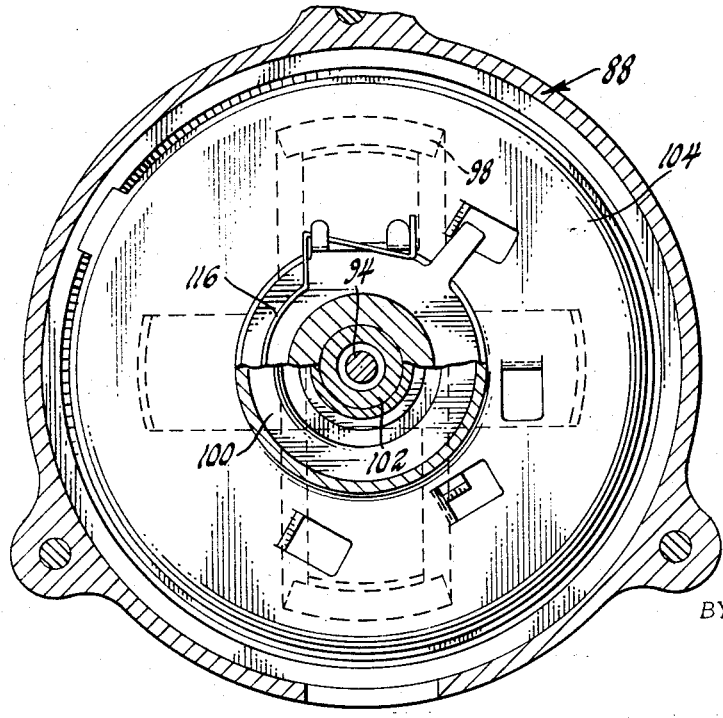
FIGURE 4 is a cross section view of a part of the speed transducer of FIGURE 3, and taken in the direction of arrows 4—4 of that figure.

The modified system shown in FIGURE 2 is generally similar to that of FIGURE 1 but is illustrated as utilizing a modified speed transducer including the engagement relay valve assembly, and power servomotor arrangement. Since many of the elements utilized are the same as that of FIGURE 1, the same reference numerals are used where applicable. In this system the power servomotor 232 is connected to throttle linkage 228 by a flexible link 230, which only transmits force in the throttle valve opening direction. Thus the usual throttle closing spring acts on the throttle valve 24 against any force exerted by servomotor 232 on the throttle linkage 228. The vacuum line 278, controlled by the valve portion of assembly 268 in alternatively connecting and disconnecting it with atmospheric air and manifold vacuum, is connected to a variable pressure chamber 240 in the servomotor 232. The conduit 280 is also connected with the servomotor variable pressure chamber 240 and transmits the speed error signal generated by the transducer assembly 234 to the servomotor 232. The brake release valve 84 is connected through conduit 82 as before, so that when the brakes are applied and valve 84 is opened, the variable pressure chamber 240 of servomotor 232 will immediately be at atmospheric pressure.

Figure 10:
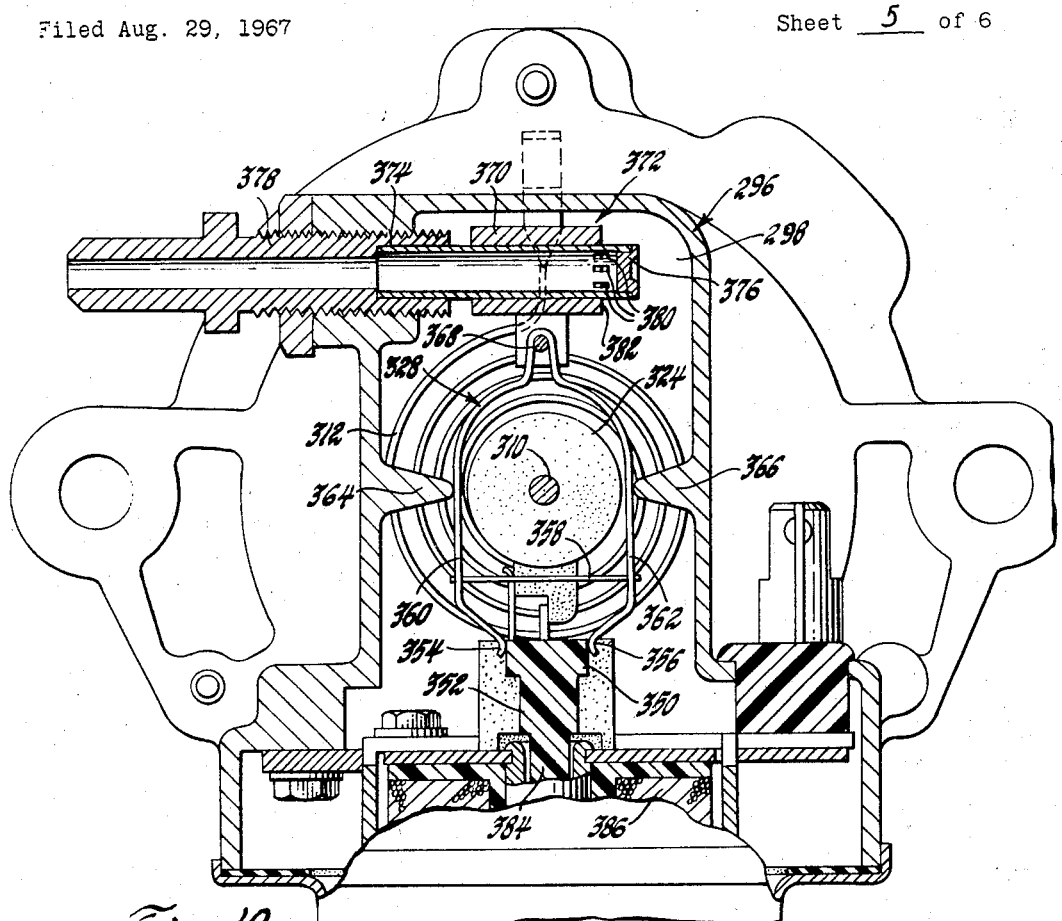
FIGURE 10 is a cross section view, with parts broken away, of the speed transducer of FIGURE 8, taken in the direction of arrows 10—10 of that figure.
Figure 11:
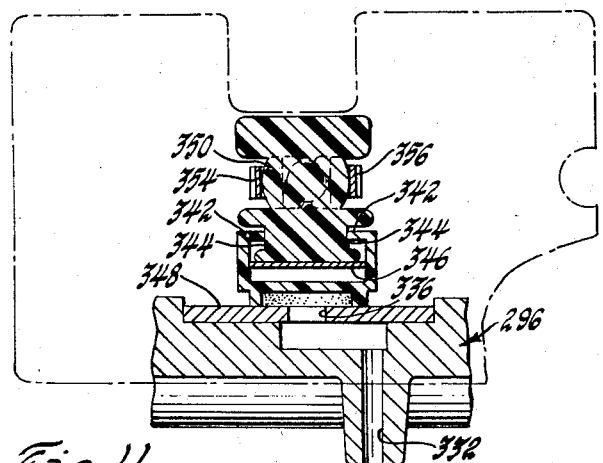
FIGURE 11 is a fragmentary cross section view of a part of the speed transducer of FIGURE 8, taken in the direction of arrows 11—11 of FIGURE 9.
Figure 12:
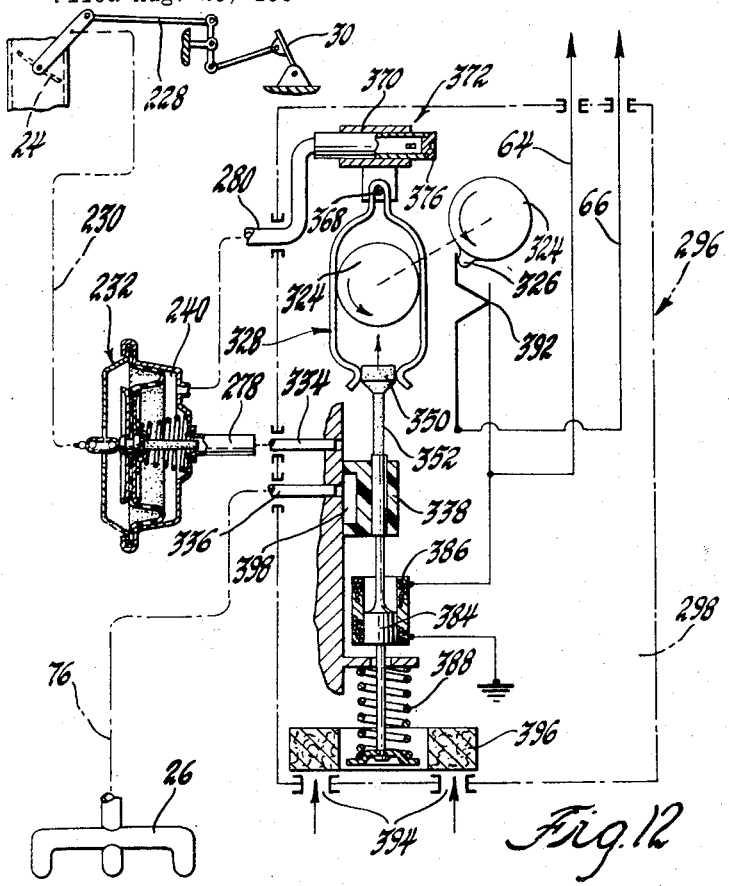
FIGURE 12 is a schematic representation of the speed transducer of FIGURES 8–11, showing it connected to a servomotor and forming a part of a road speed control system such as the system of FIGURE 2.
Figure 14:
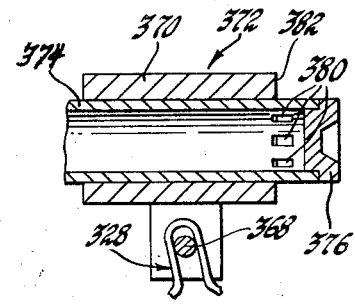
FIGURE 14 is similar to FIGURE 13, showing the speed error valve in a position wherein the actual vehicle speed is greater than the desired vehicle speed.

The speed transducer assembly 234, which includes the engagement relay and valve assembly 268, is shown in greater detail in FIGURES 8 through 15. The schematic representation of FIGURE 12 shows the transducer in simplified form. The assembly has a housing 296 with an atmospheric pressure chamber 298 provided therein. The speedometer cable 36 from the transmission output shaft, or other suitable speed pickup, is connected to the shaft 300, which drives the gear 302. This gear is mounted on shaft 304, which is connected to flexible cable 38 to drive the speedometer 40. Shaft 304 also is so mounted in housing 296 as to rotate the ceramic magnet 306 which forms a speed member and is part of the actual vehicle speed signal generating mechanism. This construction is generally similar to that of the usual speedometer. A speed cup or disc 308 is mounted on a shaft 310 so that the speed cup is movable arcuately to reflect vehicle speed under influence of rotation magnet 306. A torsion spring 312 is connected to shaft 310 and to the speed transducer housing to provide a calibrated resistance to the movement of the speed cup. A field plate 314 is positioned in the housing adjacent the speed cup 308 by means of tabs 316 and mating ramp surfaces 318. The field plate has a peripheral gear sector 320 which mates with an adjusting gear 322. As the adjusting gear is rotated the field plate rotates and moves toward or away from the ceramic magnet 306, adjusting the gap therebetween and resulting in a calibration which is set during manufacture. Magnetic force exerted by the magnet 306 holds the field plate tightly against the ramp surfaces and the gear 322 is locked after adjustment to hold the plate in the desired position. The disc forming clutch member 324 is secured to shaft 310 for arcuate movement therewith. The speed cup driven cam 326 is attached to a part of the clutch member 324, which is axially spaced from the portion selectively clutched by the clutch spring 328.

The passages 330 and 332 are formed as an integral part of the transducer housing 296 and are connected with the valve plate apertures 334 and 336 and suitable grooves, as may best be seen in FIGURES 9 and 11. The slide valve 338 is attached to a part of the clutch control cam 340 by ears 342 which fit in cam slots 344. Slide valve spring 346 is positioned between the cam 340 and the slide valve 338 and urges the valve flatly against the valve plate 348. The clutch control cam 340 has an enlarged section 350 supported by a smaller section 352 so that the clutch spring ends 354 and 356 are spread apart when they engage section 350, but move closer together when aligning with section 352. A small bar 358 is inserted through aligned openings in the spring sides 360 and 362 and is provided with enlarged or bent ends. The bar 358 limits upward movement of clutch spring 328 as cam 340 moves upward during activation, establishing radial freedom of lost motion movement between the spring and the valve pin 368. The transducer housing 296 is provided with inwardly extending spring centering lugs 364 and 366 which engage the spring sides 360 and 362 when the spring ends are spread apart, thereby establishing with the cam section 350 three position points on the spring 328 and locating the spring in a precise potsition when it is in a clutch released condition. The upper end of the clutch spring 328 is preferably formed into a reduced U-shape so that the valve pin 368 is received therein with just sufficient tolerance to permit slidable movement of the pin relative to the spring. This provides a radial lost motion connection permitting arcuate movement of spring 328 to be translated into linear valve movement parallel to a tangent of the arc subtended by movement of spring 328 and disc 324. The pin 368 is secured to the slide valve 370 forming a part of the valve assembly 372. Valve 370 is formed as a cylinder which is slidable on a tube 374. One end of the tube is closed by a plug 376, and the other end is secured to and fluid connected with the fitting 378, which is connected in the system of FIGURE 2 to the conduit 280. The threaded portion of fitting 378 provides a firm mount in the transducer housing for the tube 374. Orifices 380 are formed in the side wall of the tube adjacent the plug 376 and are so positioned relative to the end 382 of the slide valve 370 that the valve end opens and closes the orifices in a modulating manner upon sliding movement. When the clutch spring 328 is in the clutch released condition and held in a center or neutral position by cam section 350 and lugs 364 and 366, as seen in FIGURE 10, the valve end 382 is positioned approximately at the center of orifices 380 so that movement of the valve 370 in either direction will change the effective area of the orifices. Therefore the valve is in the position substantially equivalent to the zero speed error position at some particular speed, adjustable by threads in fitting 378, and is poised for immediate control when the system is activated.

The clutch control cam 340 is secured to the solenoid armature 384 which is slidably mounted within the solenoid winding 386. The spring 388 engages the spring seat 390 mounted on the lower end of the armature 384 so that the armature and the cam 340, and therefore the slide valve 338, are urged downwardly into the position shown in the drawings. When the solenoid winding 386 is sufficiently energized, the armature 384 moves upwardly against the force of spring 388 so that the clutch spring ends 354 and 356 are aligned with the smaller cam section 352, and the spring sides 360 and 362 move inwardly to grip the clutch member 324, therefore establishing a certain arcuate relationship between clutched member 324 and clutching member 328 which is indicative of the actual vehicle speed occurring at the time. Since the clutch member 324 is formed of a rubber-like material which will enhance the clutch-engaging force, the relationship so established will be carefully maintained.

The system operates as follows. The vehicle is considered to be running at a road speed of, for example, 20 m.p.h. Under such conditions the ignition switch 44 and the brake switch 46 are closed. The slide bar 56 engages contacts 52 and 58. The speed cup driven cam 326 has not advanced sufficiently to permit switch 392 to close. This switch is in series with the solenoid winding 386 and the contact 60 so that it must be closed before the winding 386 can be energized through electrical lead 66. While electrical lead 64 is directly connected from contact 58 to the winding 386 through resistor 70, this resistance is such that the power furnished the winding 386 through lead 64 is insufficient to move the armature 384 against the force of spring 388. Therefore the valve 338 is so positioned that passage 334 is connected with atmospheric pressure contained within the transducer housing chamber 298, being admitted through apertures 394 and filter 396. Passage 336 is connected only to the valve chamber 398 so that the end of conduit 76 connected to passage 332 is effectively closed. Since conduit 278 is connected to the servomotor and to the transducer assembly through passages 330 and 334, the servomotor chamber 240 is also at atmospheric pressure and is in a position equivalent to a zero throttle position, with the flexible link 230 being relaxed. The clutch spring arms 360 and 362 are spread apart by cam section 350 so that the spring 328 does not grip the member 324. Instead, the spring is in a center position due to its engagement with the cam section 350 and the centering lugs 364 and 366. The valve 370 of the valve assembly 372 is also in the center position shown in FIGURES 10 and 13.

As the vehicle speed increases above that for which cam 326 is set, the cam allows switch 392 to close. The system may then be energized by the vehicle operator when desired. Assuming the vehicle operator to have accelerated the vehicle to a road speed of 50 m.p.h. by manual operation of the accelerator pedal 30, the system is in the position shown in FIGURE 2 of the drawings. Should the operator desire to energize the system at this speed, he moves the slide bar 56 of the manual switch 54 in the direction of arrow 62 until the bar also engages electrical contact 60. This energizes electrical lead 66, which bypasses the resistor 70 so that solenoid winding 386 is sufficiently energized to overcome the force of spring 388. Armature 384 therefore moves upwardly. The operator may then release the manual switch so that it returns to the position wherein the slide bar 56 only engages contacts 52 and 58. The portion of the electrical circuit including electrical lead 64 and resistor 70 will remain energized, being in parallel to electrical lead 66 and switch 392, and will act as a holding circuit for the solenoid winding since the resistor will permit sufficient current to be delivered to the winding 386 to hold armature 384 in the energized position.

Figure 13:
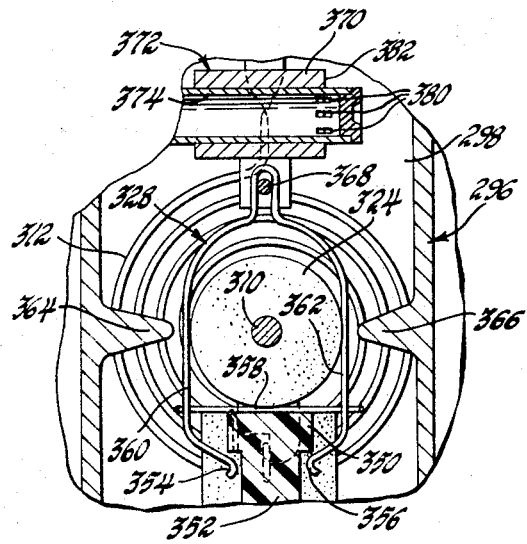
FIGURE 13 is a fragmentary cross section view of a portion of the speed transducer as seen in FIGURE 8, showing the speed transducer in the operative condition and the speed error valve in a position which is commensurate with zero speed error.

Movement of armature 384 causes the valve 338 to move upwardly and fluid connect apertures 334 and 336 so that manifold vacuum is then conected to the servomotor through conduit 278. At the same time cam 340 has moved upwardly to release the spring ends 354 and 356 so that the spring sides or arms 360 and 362 grip the clutch member 324. The radial lost motion relationship of the clutch member 324 and the pin 368, and thus the valve 370, shown in FIGURE 13, is also established. Since the vehicle is traveling at 50 m.p.h. at the time of energization of the system, clutch member 324 is arcuately positioned in a position reflecting that vehicle speed. Therefore, the actual vehicle speed at the time of system activation becomes the established desired vehicle speed.

The servomotor will then create a force which will tighten the flexible link 230 in tension, with the exact position at the time the link is tightened being determined by the position of the throttle valve 24. The valve assembly 372 will modulate atmospheric pressure into the servomotor in an amount sufficient to hold the throttle valve at the required position to maintain the desired vehicle speed established as above described.

Figure 15:
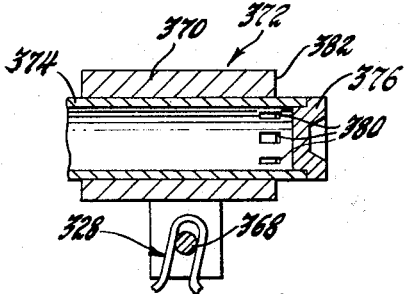
FIGURE 15 is similar to FIGURE 13, showing the speed error valve in a position wherein the actual vehicle speed is less than the desired vehicle speed.

When the vehicle speed changes due to changes in road load, the clutch spring 328 and clutch member 324 move arcuately together. This in turn moves the valve member 370 linearly to modulate the orifice means 380. If, for example, the vehicle tends to slow down due to an increase in road load, the clutching spring and the clutch member will move clockwise as seen in FIGURE 13, thereby moving the edge 382 of the valve member 370 to the right, as shown in FIGURE 15, decreasing the effective area of orifices 380. This decreases the amount of atmospheric pressure air bleeding into the servomotor chamber 240 through conduit 280, decreasing the absolute pressure therein and moving the throttle valve 24 to a slightly additional amount of opening position so that the vehicle engine delivers additional power. On the other hand, if the vehicle tends to increase road speed due to a decrease in road load, the valve member 370 is moved slightly leftward, as exemplified by FIGURE 14, to increase the effective area of orifices 380 and therefore increase the atmospheric pressure air bleed into the servomotor. This will slightly decrease the pressure differential acting on the servomotor power wall, allowing the throttle valve return spring to move the throttle valve 24 slightly closed since the throttle valve opening force exerted on the throttle linkage 228 through the flexible link 230 has been decreased. This will slightly decrease the power delivered by the engine.

The vehicle operator may at any time accelerate the vehicle to a speed greater than the desired speed by manually depressing the accelerator pedal 30. This will merely result in slackening the flexible link 230. If the operator should accelerate the vehicle to a speed of 60 m.p.h., for example, and then desire to reset the system so that it will maintain this new speed, he merely presses the manual switch 54 inwardly until the slide bar 56 is connected with contacts 58 and 60 but disconnected from contact 52. This causes the solenoid 386 to be de-energized and the system is immediately returned to the condition shown in FIGURES 2 and 8–12. The clutch member 324 is released by the clutch spring arms 360 and 362, and the spring member 328 and valve 370 return to the position shown in FIGURES 10 and 12. The operator then releases the manual switch 54, while driving at the new desired vehicle speed. The slide bar 56 then returns to the position shown in solid lines in FIGURES 1 and 2, passing through a condition wherein all contacts 52, 58 and 60 engage the slide bar. While the slide bar passes through this position, the system is again energized, with the clutch spring 328 again gripping the clutch member 324 at the new speed setting. The system then operates to control vehicle speed at the new speed.

The system is de-energized by opening brake switch 46 when the brakes are applied or by opening ignition switch 44. This results in immediate de-energization of solenoid 386 so that the system is returned to the inactive position. The vent valve 84 is also provided for actuation by the vehicle brake pedal 48 and will immediately vent the power servomotor chamber 240 to atmosphere, thereby serving as a mechanical system inactivation arrangement which does not depend upon movement of armature 384.

What is claimed is:

1. A speed transducer for a vehicle or the like comprising:
   a rotatable disc having an angular position in accordance with the value of the vehicle speed;
   a control unit having an element effective to control the vehicle speed;
   a clutch member having clutching parts adapted in one condition to grip the periphery of the disc to move in unison therewith and connected to the control unit to control the vehicle speed in response to such movement;
   the clutch member in another condition releasing the disc to permit independent movement of the disc;
   and manually controlled means selectively operable to actuate the clutch member to said one condition;
   said control unit, disc, and clutch member acting in a sense to decrease vehicle speed in response to movement of the rotatable disc in the increased-speed direction.

2. For use in a vehicle road speed control system comprising an engine having a throttle valve and manual throttle valve control linkage to control the opening and closing movement of the throttle valve to manually control the speed and power of the engine and therefore the vehicle road speed; a servomotor connected to the throttle valve and actuable to move the throttle valve in a valve opening direction upon an increase in differential pressure acting on the servomotor, the servomotor having a variable pressure chamber selectively operatively connected to the engine intake manifold; a vehicle road speed pickup including means driven at a speed directly proportional to vehicle road speed; and manually controlled means for selectively controlling activation and deactivation of the vehicle road speed control system;
   the improvement comprising a speed transducer having:
   a rotatable magnet adapted to be operatively driven at speeds proportional to vehicle road speeds by the driven means;
   a magnetically responsive disc rotatably mounted on a shaft and arcuately displaceable from a first position by influence of the rotation of said rotatable magnet;
   resilient means opposing rotation of said magnetically responsive disc whereby the quantitative angular displacement of said magnetically responsive disc is directly related to and a function of vehicle road speed;
   a clutch mechanism including, a clutched member defined by a disc mounted on the shaft of said magnetically responsive disc and arcuately movable therewith and having a cylindrical outer periphery, and a clutching member substantially encircling said clutched member and being a generally U-shaped spring having the legs thereof spring biased to grip said clutched member when released to establish the then-existing relative angular relationship between the clutched and clutching members, said relationship being in accord with the speed of the vehicle at the time the clutching member is released, which speed is thereby established as a desired vehicle speed with the difference between the desired vehicle speed and actual vehicle speeds differing therefrom being speed error;
   a cam extending between the ends of the legs of said clutching member;
   and having a first position biasing said legs apart sufficiently to disengage the clutch members to permit the disc defining the clutched member to move arcuately and independently relative to the clutching member,
   and having a second position permitting the spring biasing of said legs to move said legs into gripping relation with said clutched member so that said clutching member is moved arcuately with and by movement of said clutched members;
   a control valve adapted to be connected to the system servomotor variable pressure chamber to vary the differential pressure acting on the servomotor to control the engine throttle valve;
   a lost motion connection connecting said control valve and said clutching member and permitting relative movement therebetween in a plane normal to the direction of movement of the control valve so as to convert the arcuate movement of said clutching member to linear modulating movement of said control valve;
   means including said cam for anchoring said clutching member and said control valve in a substantially centered position when said cam is biasing said clutching member away from said clutched member,
   and power means for selectively moving said cam from the first cam position to the second cam position and for selectively holding the cam in the second cam position, said power means being adapted to be controlled by the manually controlled control means.

3. The speed transducer of claim 2 further comprising:
   a first passage adapted for connection with the engine intake manifold as a source of vacuum;
   a second passage adjacent said first passage and adapted for connection with the variable pressure chamber of the servomotor;
   a valve seat through which said passages extend;
   and a valve selectively movable relative to said seat to close said first passage and open said second passage to atmosphere in one selective mode and to fluid connect said first and second passages while sealing both passages from atmosphere in a second selective mode;
   means interconnecting said valve and said cam to move said valve to the second selective mode when said cam is moved to said second cam position
   and to move said valve to the one selective mode when said cam is moved to said first cam position;
   and a third passage cooperatively connected with said control valve and adapted to be fluid connected to the servomotor variable pressure chamber;
   said control valve controlling bleed of atmospheric pressure into the servomotor variable pressure chamber through said third passage.

4. The speed transducer of claim 2, further comprising:
   a housing having a sealed chamber therein;
   a first passage adapted for selective connection with the engine intake manifold as a source of vacuum under control of said manually controlled control means and fluid connected with said housing chamber;
   a second passage adapted for connection with the variable pressure chamber of the servomotor and fluid connected with the output side of said control valve;
   a third passage connected with atmosphere and with the input side of said control valve;

and a fourth passage connecting said housing chamber with the input side of said control valve whereby said control valve receives atmospheric pressure and manifold vacuum as pressure inputs and generates a pressure output therefrom in said second passage in accordance with the controlling action of said control valve when said first passage is connected to said engine intake manifold and said housing chamber.

5. The speed transducer of claim 4, said housing sealed chamber having a differential pressure responsive wall section with atmospheric pressure on one side and housing chamber pressure on the other side and comprising at least a part of said cam moving power means, said wall section being moved by the pressure differential existing thereacross when said housing chamber is fluid connected with the engine intake manifold to move said cam from said first position to said second position.

6. A speed transducer comprising:
   a rotatable disc having an angular position reflecting sensed speed,
   a control unit having an element effective to control the sensed speed,
   a clutch member encircling said disc and connected to said control unit element
   and having a first condition in which it is spread to release said disc and a second condition in which it grips said disc for arcuate movement therewith and the relative positions thereof reflect the sensed speed existing at the time the second condition is established,
   and manually controlled means selectively spreading said clutch member;
   said control unit acting in response to movement of said disc and said clutch member caused by a change in the sensed speed in a sense to return the sensed speed to the speed value reflected by the relative positions of said clutch member and said disc when said clutch member is in said second condition.

7. A speed transducer comprising:
   a speed sensor having
   a rotary magnet rotatable throughout a predetermined speed range,
   and a disc arcuately displaceable from an initial position in accordance with the rotary speed of said magnet;
   a control unit having an element movable in a line substantially parallel to a tangent line of said disc and effective to control the rotary speed of said magnet;
   a clutch member encircling said disc and connected to said control unit element in radial lost motion relationship
   and having a first condition in which it is spread to release said disc and a second condition in which it grips said disc for arcuate movement therewith;
   and manually controlled means selectively spreading said clutch member;
   said control unit acting when said clutch member is in said second condition in response to movement of said disc and said clutch member caused by a change in the speed of said rotary magnet in a sense to return the rotary speed of the magnet to the magnet rotary speed value existing before the change in speed.

8. A transducer comprising:
   a drive member rotatable throughout a predetermined speed range;
   a drive member arcuately movable in response to and reflective of the rotational speed of said drive member;
   a clutch member substantially encircling said driven member and being, selectively, spread outward from said driven member, and released to grip said driven member and move arcuately therewith as the rotational speed of said drive member changes from the speed existing at the time said clutch member gripped said driven member;
   a control connected with said clutch member and movable by arcuate movement of said clutch member and controlling the speed of said drive member to cause said driven member to seek the arcuate position thereof reflecting the speed of the drive member existing at the time said clutch member gripped said driven member;
   and manually controlled means selectively spreading and releasing said clutch member.

9. A transducer comprising:
   means movable in response to and reflective of a sensed speed and including a selectively clutched member;
   power control means having differential first and second power inputs and a modulated power output and modulating means acting on said inputs to generate said output therefrom;
   a selectively actuated clutching member selectively clutching said selectively clutched member and connected to said modulating means and when clutched establishing a nominal power output reflective of said sensed speed at the time of clutching, further movement of said clutched member acting through said clutching member and said modulating means to change said power output from said nominal power output in accordance with changes in the sensed speed;
   said clutched member being a rubber-like cylinder and said clutching member being a yoke spring extending about and biased to grip said cylinder to move therewith;
   and means selectively spreading said yoke spring to release said cylinder.

10. The transducer of claim 9, further comprising means controlling said selectively spreading means and including:
    a control circuit having an arcuate contact on said cylinder and another contact engaging said arcuate contact to close said control circuit only when the arcuate position of said cylinder reflects a predetermined sensed speed and to open said control circuit at sensed speeds less than said predetermined sensed speed,
    and a solenoid controlled by said control circuit and connected to arcuate said selectively spreading means.

11. The transducer of claim 9, said modulating means comprising:
    a housing having valve receiving passage means and a valve reciprocably received in said passage means and connected to move axially with arcuate movement of said clutching member,
    said housing having a modulating pressure chamber connecting with said valve receiving passage means and in which said modulated power output is generated as a fluid pressure,
    and first and second pressure input orifices connecting with said valve receiving passage means to be proportionally controlled by said valve by axial valve position,
    said differential power inputs being differential fluid pressures, one of which is connected to said first orifice and the other of which is connected to said second orifice.

12. The transducer of claim 11,
    said clutched member moving arcuately with changes in sensed speed and said clutching member when clutched thereto likewise moving arcuately and connected to said valve to translate said arcuate movement to valve axial movement to modulate said power output in accordance with changes in sensed speed from the speed sensed when said clutching member clutched said clutched member.

13. The transducer of claim 9,
    said first and second power inputs respectively being atmospheric pressure and a pressure other than atmospheric pressure, said transducer having a pressure sealed housing selectively receiving said second pressure therein and containing said clutched and clutching members and means selectively actuating said clutching member including a differential pressure responsive power wall having atmospheric pressure on one side and the other side exposed to the interior of said housing, said power wall acting upon receipt of said second pressure in said housing to actuate said clutching member.

14. The transducer of claim 13, further comprising: means responsive to a predetermined minimum sensed speed preventing the receipt of said second pressure in said housing when said sensed speed is below said predetermined minimum sensed speed.

References Cited

UNITED STATES PATENTS

| | | | |
|---|---|---|---|
| 2,086,967 | 7/1937 | Sontagh | 192—79 X |
| 2,945,547 | 7/1960 | Bunker | 123—103 X |
| 3,062,311 | 11/1962 | Sampson | 73—530 X |
| 3,183,993 | 5/1965 | Parker et al. | 123—103 X |
| 3,216,522 | 11/1965 | Cassano | 123—102 |
| 3,340,952 | 9/1967 | Day | 180—108 |

KENNETH H. BETTS, *Primary Examiner.*

U.S. Cl. X.R.

73—519, 530; 123—103; 180—109; 192—79